US009013727B2

(12) United States Patent
Kuwahara

(10) Patent No.: US 9,013,727 B2
(45) Date of Patent: Apr. 21, 2015

(54) NETWORK PRINTING SYSTEM, PRINTING APPARATUS, PRINTING DATA TRANSMITTING DEVICE, AND COMPUTER PROGRAM

(75) Inventor: Tetsuya Kuwahara, Kyoto (JP)

(73) Assignee: Murata Machinery, Ltd., Kyoto-shi (JP)

( * ) Notice: Subject to any disclaimer, the term of this patent is extended or adjusted under 35 U.S.C. 154(b) by 0 days.

(21) Appl. No.: 13/978,346

(22) PCT Filed: Dec. 13, 2011

(86) PCT No.: PCT/JP2011/078776

§ 371 (c)(1),
(2), (4) Date: Aug. 2, 2013

(87) PCT Pub. No.: WO2012/093562

PCT Pub. Date: Jul. 12, 2012

(65) Prior Publication Data

US 2014/0002861 A1    Jan. 2, 2014

(30) Foreign Application Priority Data

Jan. 5, 2011 (JP) .................................. 2011-000495

(51) Int. Cl.
*G06F 3/12* (2006.01)
*G06K 1/00* (2006.01)
*G03G 15/00* (2006.01)
*G06K 15/00* (2006.01)
*H04N 1/00* (2006.01)
*H04N 1/333* (2006.01)

(52) U.S. Cl.
CPC ........ *G06K 15/4065* (2013.01); *H04N 1/00233* (2013.01); *H04N 1/33315* (2013.01);
CPC .......... *H04N 2201/0082* (2013.01); *H04N 2201/3204* (2013.01); *H04N 2201/3222* (2013.01); *H04N 2201/3273* (2013.01); *H04N 2201/3274* (2013.01); *H04N 2201/3278* (2013.01); *G06F 3/1219* (2013.01); *G06F 3/1255* (2013.01); *G06F 3/1286* (2013.01); *G06F 3/1257* (2013.01)

(58) Field of Classification Search
None
See application file for complete search history.

(56) References Cited

U.S. PATENT DOCUMENTS

| 8,630,014 B2* | 1/2014 | Fujiwara ........................ 358/1.2 |
| 2005/0168760 A1 | 8/2005 | Shibasaki |
| 2006/0228138 A1* | 10/2006 | Mori .............................. 399/391 |
| 2008/0218797 A1* | 9/2008 | Kasuga ........................ 358/1.15 |
| 2010/0118321 A1 | 5/2010 | Ebuchi et al. |
| 2010/0134806 A1* | 6/2010 | Fujiwara ........................ 358/1.2 |

FOREIGN PATENT DOCUMENTS

| JP | 2002-006696 | 1/2002 |
| JP | 2002-297344 | 10/2002 |
| JP | 2003-260857 | 9/2003 |
| JP | 2004-234169 | 8/2004 |
| JP | 2005-173144 | 6/2005 |
| JP | 2007-011476 | 1/2007 |
| JP | 2007-034533 | 2/2007 |
| JP | 2007-320247 | 12/2007 |
| JP | 2008-292826 | 12/2008 |
| JP | 2009-211382 | 9/2009 |
| JP | 2010-117915 | 5/2010 |
| JP | 2010-167577 | 8/2010 |

OTHER PUBLICATIONS

International Search Report issued on PCT/JP2011/078776 mailed Feb. 14, 2012.
EP Extended Search Report issued on Application No. 11855000.3 mailed Feb. 11, 2014.

* cited by examiner

*Primary Examiner* — Thomas Lett
(74) *Attorney, Agent, or Firm* — Adli Law Group P.C.

(57) ABSTRACT

The present invention is intended to provide a print data transmitting device that can teach an operator a recommended print condition corresponding to a size of recording paper in a printing apparatus. The print data transmitting device is configured to include: a print condition storage part that retains a print condition specified by a user as a user-specified print condition; a print condition comparing part that compares a recommended print condition, which is obtained from print setting information including a size of recording paper and availability of double-sided printing and corresponds to the size of the recording paper, and the user-specified print condition with each other; a changing screen display part that, in the case where the user-specified print condition does not coincide with the recommended print condition, displays a changing screen that includes the recommended print condition and is arranged with a selection button for selecting the recommended print condition as a print condition; a print condition changing part that, on the basis of an operation of the selection button, changes the user-specified print condition; a print data generating part that, on the basis of a print instruction, generates print data including the user-specified print condition; and a print data transmitting part that transmits the print data.

6 Claims, 14 Drawing Sheets

*Fig. 7*

RECOMMENDED PRINT CONDITION

| PATER SIZE | SETTING PATTERN OF ECO-PRINTING CONDITION WHICH CAN BE COMBINED WITH | |
|---|---|---|
| | DOUBLE-SIDED PRINTING UNIT IS ATTACHED, AND NEW SHEETS ARE USED | DOUBLE-SIDED PRINTING UNIT IS NOT ATTACHED, OR SCRATCH PATER IS USED |
| A3 | 2in1 (REDUCED TO A4), 4in1 (REDUCED TO A5)<br>2in1 AND DOUBLE-SIDED PRINTING<br>4in1 AND DOUBLE-SIDED PRINTING<br>DOUBLE-SIDED PRINTING | 2in1 (REDUCED TO A4), 4in1 (REDUCED TO A5) |
| B4 | 2in1 (REDUCED TO B5)<br>2in1 AND DOUBLE-SIDED PRINTING<br>DOUBLE-SIDED PRINTING | 2in1 (REDUCED TO B5) |
| A4 | 2in1 (REDUCED TO A5)<br>2in1 AND DOUBLE-SIDED PRINTING<br>DOUBLE-SIDED PRINTING | 2in1 (REDUCED TO A5) |
| B5 | DOUBLE-SIDED PRINTING | NONE |
| A5 | DOUBLE-SIDED PRINTING | NONE |

NETWORK PRINTING SYSTEM, PRINTING APPARATUS, PRINTING DATA TRANSMITTING DEVICE, AND COMPUTER PROGRAM

CROSS REFERENCE

This Application is the U.S. national phase of PCT/JP2011/78776, filed on Dec. 13, 2011, which claims the benefit of JP2011-000495 filed on Jan. 5, 2011, both of which are incorporated herein by reference in their entirety.

TECHNICAL FIELD

The present invention relates to a network printing system, printing apparatus, print data transmitting device, and computer program, and more particularly, to a network printing system including: a printing apparatus that performs printing; and a print data transmitting device that transmits print data including document data as a print target to the printing apparatus through a communication network.

BACKGROUND SECTION OF THE INVENTION

Printing methods at the time of printing image data read from a manuscript on recording paper include single-sided printing, double-sided printing, and aggregate printing. In the case of the single-sided printing, one page of image data is printed on one side of a sheet of recording paper. On the other hand, in the case of the double-sided printing, two pages of image data are respectively printed on both sides of a sheet of recording paper, and in the case of the aggregate printing, a plurality of pages of image data is printed on one side of a sheet of recording paper with an image to be printed being reduced. Such double-sided printing and aggregate printing are eco-printing having a smaller amount of recording paper consumption than the single-sided printing, and therefore there is proposed a copying machine that proactively utilizes the double-sided printing or aggregate printing as one of resource saving measures (e.g., Patent Literature 1 (JP-A2003-260857)). Also, in some cases, by using so-called scratch paper of which one side is printed and only the other side is usable, paper resources are effectively utilized.

In the case of PC printing that prints document data on a PC (personal computer), which is connected to a printing apparatus through a LAN (local area network), through the network, the document data is printed according to print conditions retained by the PC (e.g., Patent Literatures 2 (JP-A2005-217878) and 3 (JP-A2008-292826). Such PC printing is sometimes performed without knowing sizes of sheets of recording paper actually contained in the printing apparatus, or without realizing that double-sided printing or printing using sheets of scratch paper is available. For this reason, there is a problem of, even though the eco-printing or the scratch paper printing is available, performing the normal single-sided printing.

Therefore, in order to solve it, it may be possible to, regardless of print settings on the PC, forcibly perform the eco-printing or scratch paper printing of the document data transferred from the PC. However, such a configuration causes a problem that even in the case of desiring to perform the normal single-sided printing, the eco-printing or scratch paper printing is performed.

Also, Patent Literature 2 describes a printing apparatus that compares the print conditions set in the PC and preliminarily retaining print conditions with each other, and if the two sets of print conditions are different from each other, transmits a message prompting a change of the print conditions to the PC. This printing apparatus can teach an operator of the PC that eco-printing or scratch paper printing is available, and as needed change the print conditions. However, in the printing apparatus described in Patent Literature 2, the message prompting a change of the print conditions is only displayed on the PC, and therefore the operator of the PC cannot identify the sizes of the sheets of recording paper contained in the printing apparatus from the message. For this reason, there is a problem that in the case of desiring to use the eco-printing or scratch paper printing, how print settings on the PC should be changed, or what print conditions the current print conditions can be actually changed to is not easily known.

SUMMARY SECTION OF THE INVENTION

The present invention is made in consideration of the above situations, and intended to provide a network printing system that can suppress an increase in amount of recording paper consumption.

Also, the present invention is intended to provide a print data transmitting device that can teach an operator a recommended print condition corresponding to a size of recording paper, and change a print condition for document data to be printed to the recommended print condition as needed, and a computer program that instructs a terminal device to function as such a print data transmitting device. In particular, the present invention is intended to provide a print data transmitting device and computer program that can, as a recommended print condition, teach an operator a print condition for eco-printing or scratch paper printing corresponding to a size of recording paper contained in a printing apparatus.

Further, the present invention is intended to provide a printing apparatus that can notify a print data generating device of a print condition for eco-printing or scratch paper printing corresponding to a size of recording paper in a containing part as a recommended print condition.

A network printing system according to a first aspect of the present invention is a network printing system including a printing apparatus and a print data transmitting device that transmits print data including document data as a print target and a print condition for the document data to the printing apparatus through a communication network, wherein the printing apparatus receives the print data to print the print data on recording paper, wherein the printing apparatus is configured to be provided with: a recording paper containing part that contains the recording paper; and a print setting storage part that retains print setting information including a size of the recording paper in the recording paper containing part and availability of double-sided printing, and the print data transmitting device is configured to be provided with: a user-specified print condition storage part that retains a print condition specified by a user as a user-specified print condition; a print condition comparing part that compares a recommended print condition corresponding to the size of the recording paper and the user-specified print condition with each other, the recommended print condition being obtained from the print setting information; a changing screen display part that, in the case where the user-specified print condition does not coincide with the recommended print condition, displays a print condition changing screen that includes the recommended print condition and is arranged with a recommended condition selecting button for selecting the recommended print condition as the print condition; a print condition changing part that, on the basis of an operation of the recommended condition selecting button, changes the user-specified print condition; a print data generating part that, on the basis of a print instruction that specifies the document data as the print target, generates the print data including the user-specified print condition in the user-specified print condition storage part as the print condition for the document data; and a print data transmitting part that transmits the print data to the printing apparatus.

In the network printing system, the print data transmitting device compares the recommended print condition, which is obtained from the print setting information and corresponds to the size of the recording paper, and the user-specified print condition with each other, and in the case where the user-specified print condition does not coincide with the recommended print condition, displays the print condition changing screen. The print condition changing screen includes the recommended print condition and is arranged with the recommended condition selecting button, and therefore by operating the recommended condition selecting button, the user-specified print condition can be changed to the recommended print condition. For this reason, an operator of the print data transmitting device can be taught a print condition for eco-printing or scratch paper printing corresponding to the size of the recording paper contained in the printing apparatus as the recommended print condition, and change the print condition for the document data to be printed to the recommended print condition as needed.

A network printing system according to a second aspect of the present invention is, in addition to the above configuration, configured such that on the print condition changing screen, two or more recommended print conditions are arranged for the one size of the recording paper, and by operating the recommended condition selecting button, the user-specified print condition can be changed to any of the recommended print conditions. According to such a configuration, the presence of the plurality of recommended print conditions corresponding to the size of the recording paper can be recognized on the print condition changing screen, and also a desired recommended print condition can be selected as the print condition for the document data.

A network printing system according to the third aspect of the present invention is, in addition to the above configuration, configured such that the print data transmitting device is provided with a print setting screen display part that, on the basis of the print instruction, displays a print setting screen that includes the user-specified print condition and is arranged with an enter button for the print condition, and in the case where the user-specified print condition coincides with any of the recommended print conditions, on the basis of an operation of the enter button, the print data generating part generates the print data, whereas in the case where the user-specified print condition does not coincide with any of the recommended print conditions, on the basis of the operation of the enter button, the changing screen display part displays the print condition changing screen.

In this network printing system, in the case where the user-specified print condition coincides with any of the recommended print conditions, by operating the enter button on the print setting screen, the print data can be quickly transmitted to the printing apparatus. On the other hand, in the case where the user-specified print condition does not coincide with any of the recommended print conditions, by operating the enter button, the print condition changing screen can be displayed.

A network printing system according to a fourth aspect of the present invention is, in addition to the above configuration, configured such that the print data transmitting device is provided with a change history storage part that retains a change history of the user-specified print condition during a period of time from the display of the print setting screen to the operation of the enter button, and on the basis of the change history, the changing screen display part determines whether or not to display the print condition changing screen.

According to such a configuration, depending on the change history of the user-specified print condition during the period of time from the display of the print setting screen to the operation of the enter button, the print condition changing screen can be displayed. For example, even in the case where the user-specified print condition does not coincide with any of the recommended print conditions, if the user-specified print condition for eco-printing or scratch paper printing has been changed, the print data can be immediately transmitted to the printing apparatus without displaying the print condition changing screen.

A network printing system according to a fifth aspect of the present invention is, in addition to the above configuration, configured such that the user-specified print condition storage part stores a print condition, which is registered as a default print condition, as the user-specified print condition on the basis of the print instruction, and in the case where the user-specified print condition is changed by the operation of the recommended condition selecting button, the print setting screen display part displays on the print setting screen a registration button for registering a user-specified print condition after the change as the default print condition. According to such a configuration, in the case of operating the recommended condition selecting button to change the user-specified print condition, by operating the registration button displayed on the print setting screen, the recommended print condition can be registered in the print data transmitting device as a new default print condition.

A printing apparatus according to a sixth aspect of the present invention is a printing apparatus that, through a communication network, receives print data including document data as a print target and a print condition for the document data, and prints the print data on recording paper, and the printing apparatus is configured to be provided with: a recording paper containing part that contains the recording paper; a print setting storage part that retains print setting information including a size of the recording paper in the recording paper containing part and availability of double-sided printing; a recommended condition generating part that, on the basis of the print setting information, obtains a recommended print condition corresponding to the size of the recording paper; and a recommended condition transmitting part that transmits the recommended print condition to a print data generating device that generates the print data.

A print data transmitting device according to a seventh aspect of the present invention is a print data transmitting device that, to a printing apparatus through a communication network, transmits print data including document data as a print target and a print condition for the document data, and the print data transmitting device is configured to be provided with: a user-specified print condition storage part that retains a print condition specified by a user as a user-specified print condition; a print setting acquisition part that, from the printing apparatus through the communication network, acquires print setting information including a size of recording paper and availability of double-sided printing; a recommended print condition generating part that, on the basis of the print setting information, obtains a recommended print condition corresponding to the size of the recording paper; a print condition comparing part that compares the user-specified print condition and the recommended print condition with each other; a changing screen display part that, in the case where the user-specified print condition does not coincide with the recommended print condition, displays a print condition changing screen that includes the recommended print condition and is arranged with a recommended condition selecting button for selecting the recommended print condition as the print condition; a print condition changing part that, on the basis of an operation of the recommended condition selecting button, changes the user-specified print condition; a print data generating part that, on the basis of a print instruction that specifies the document data as the print target, generates the print data including the user-specified print condition in the user-specified print condition storage part as the print condition for the document data; and a print data transmitting part that transmits the print data to the printing apparatus.

A computer program according to an eighth aspect of the present invention is a computer program that is executed in a print data transmitting device that, to a printing apparatus through a communication network, transmits print data including document data as a print target and a print condition for the document data, and the computer program is configured to be provided with: a user-specified print condition storage step of storing a print condition specified by a user as a user-specified print condition; a print setting acquisition step of, from the printing apparatus through the communication network, acquiring print setting information including a size of recording paper and availability of double-sided printing; a recommended print condition generating step of, on the basis of the print setting information, obtaining a recommended print condition corresponding to the size of the recording paper; a print condition comparing step of comparing the user-specified print condition and the recommended print condition with each other; a changing screen display step of, in the case where the user-specified print condition does not coincide with the recommended print condition, displaying a print condition changing screen that includes the recommended print condition and is arranged with a recommended condition selecting button for selecting the recommended print condition as the print condition; a print condition changing step of, on the basis of an operation of the recommended condition selecting button, changing the user-specified print condition; a print data generating step of, on the basis of a print instruction that specifies the document data as the print target, generating the print data including the user-specified print condition as the print condition for the document data; and a print data transmitting step of transmitting the print data to the printing apparatus.

In the network printing system according to the present invention, the print data transmitting device compares the recommended print condition, which is obtained from the print setting information and corresponds to the size of the recording paper, and the user-specified print condition with each other, and in the case where the user-specified print condition does not coincide with the recommended print condition, displays the print condition changing screen. The print condition changing screen includes the recommended print condition and is arranged with the recommended condition selecting button, and therefore by operating the recommended condition selecting button, the user-specified print condition can be changed to the recommended print condition. For this reason, an operator of the print data transmitting device can be taught, as the recommended print condition, a print condition for eco-printing or scratch paper printing corresponding to the size of the recording paper contained in the printing apparatus, and change the print condition for the document data to be printed to the recommended print condition as needed. Accordingly, a network printing system that can suppress an increase in recording paper consumption can be realized.

Also, by the print data transmitting device according to the present invention, and the computer program that instructs a terminal device to function as the print data transmitter, an operator can be taught the recommended print condition corresponding to the size of the recording paper, and change the print condition for the document data to be printed to the recommended print condition as needed. In particular, the operator can be taught, as the recommended print condition, the print condition for eco-printing or scratch paper printing corresponding to the size of the recording paper contained in the printing apparatus.

Further, the printing apparatus according to the present invention can notify the print data generating device of, as the recommended print condition, the print condition for eco-printing or scratch paper printing corresponding to the size of the recording paper in the containing part.

BRIEF DESCRIPTION OF DRAWINGS

FIG. 7 is a diagram illustrating an example of operation of the print data transmitting device 11 in FIG. 4 at the time of recommended print condition generation, in which recommended condition sets including a plurality of sets of recommended print conditions are illustrated.

DETAILED DESCRIPTION OF THE INVENTION

Figure 1:
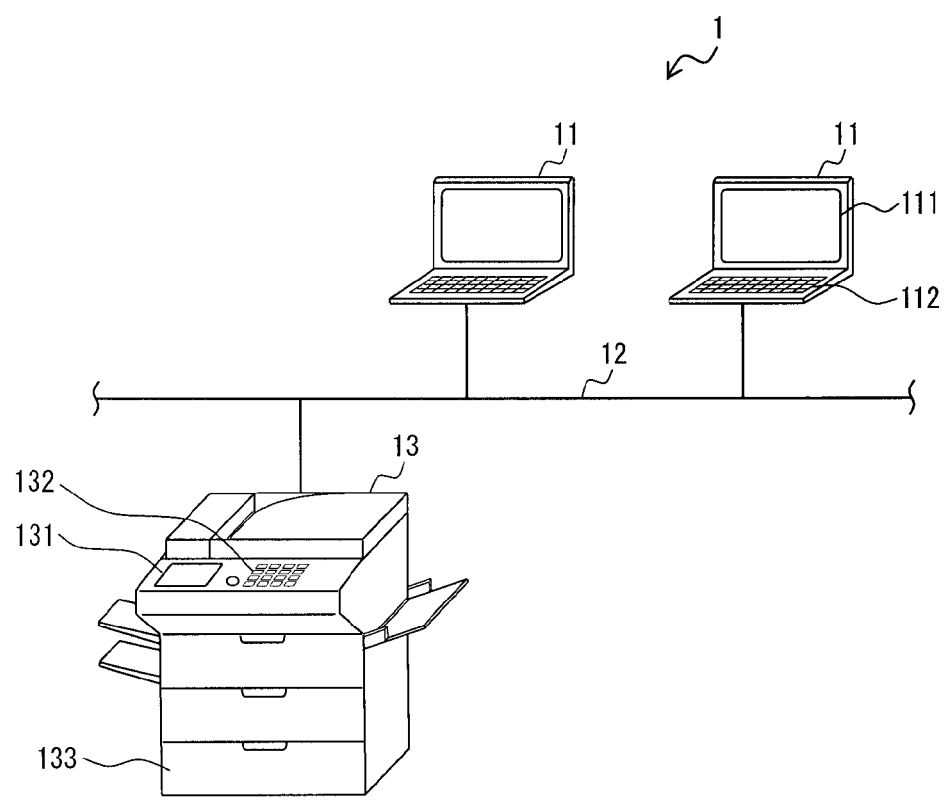
FIG. 1 is a system diagram illustrating a configuration example of a network printing system 1 according to a first embodiment of the present invention, in which, as an example of a printing apparatus, an MFP 13 is illustrated.

FIG. 1 is a system diagram illustrating a configuration example of a network printing system 1 according to a first embodiment of the present invention, in which, as an example of a printing apparatus that performs printing, an MFP (Multifunction Peripheral) 13 is illustrated. The network printing system 1 is a communication system in which a plurality of print data transmitting devices 11 and the one MFP 13 are mutually connected through a LAN 12, and through the MFP 13, can print document data generated in each of the print data transmitting devices 11.

Each of the print data transmitting devices 11 is a terminal device that generates print data including document data as a print target and print conditions for the document data, and transmits the print data to the MFP 13 through the LAN 12, and provided with a display 111 and an operation part 112. The print data transmitting device 11 includes a PC installed with application programs for printing, i.e., a so-called print utility and printer driver. The print data is print job data including the document data to be printed, the print conditions for the document data, a control code for the MFP 13, and the like, and generated on the basis of a predetermined print instruction based on a user operation.

The MFP 13 is an image processing apparatus that has a scanner function, printer function, FAX (facsimile) function, copy function, and electronic mail transceiving function, and can selectively perform any of the functions. The MFP 13 is provided with a display part 131, an operation part 132, and a plurality of paper feeding cassettes 133, and receives print data through the LAN 12 to print the print data on recording paper. The recording paper is a print sheet for printing the print data, and made of a predetermined paper medium. Each of the paper feeding cassettes 133 is a recording paper containing part for containing such recording paper before printing.

In the network printing system 1, a normal print mode, or a resource saving print mode that suppresses an increase in the amount of recording paper consumption can be selected. In the normal print mode, printing is performed according to print settings that are preliminarily specified in each of print data transmitting devices 11 as a set of print conditions for document data. On the other hand, in the resource saving print mode, sets of print conditions for eco-printing or scratch paper printing corresponding to sizes of sheets of recording paper contained in the MFP 13 are automatically generated as sets of recommended print conditions, respectively, and in the case where the print settings on the print data transmitting device 11 are different from any of the sets of recommended print conditions, the sets of recommended print conditions are displayed on the display 111. By displaying the sets of recommended print conditions, a user can change the set of print conditions for the document data as a print target to any of the sets of recommended print conditions as needed, and therefore effectively utilize paper resources.

Figure 2:
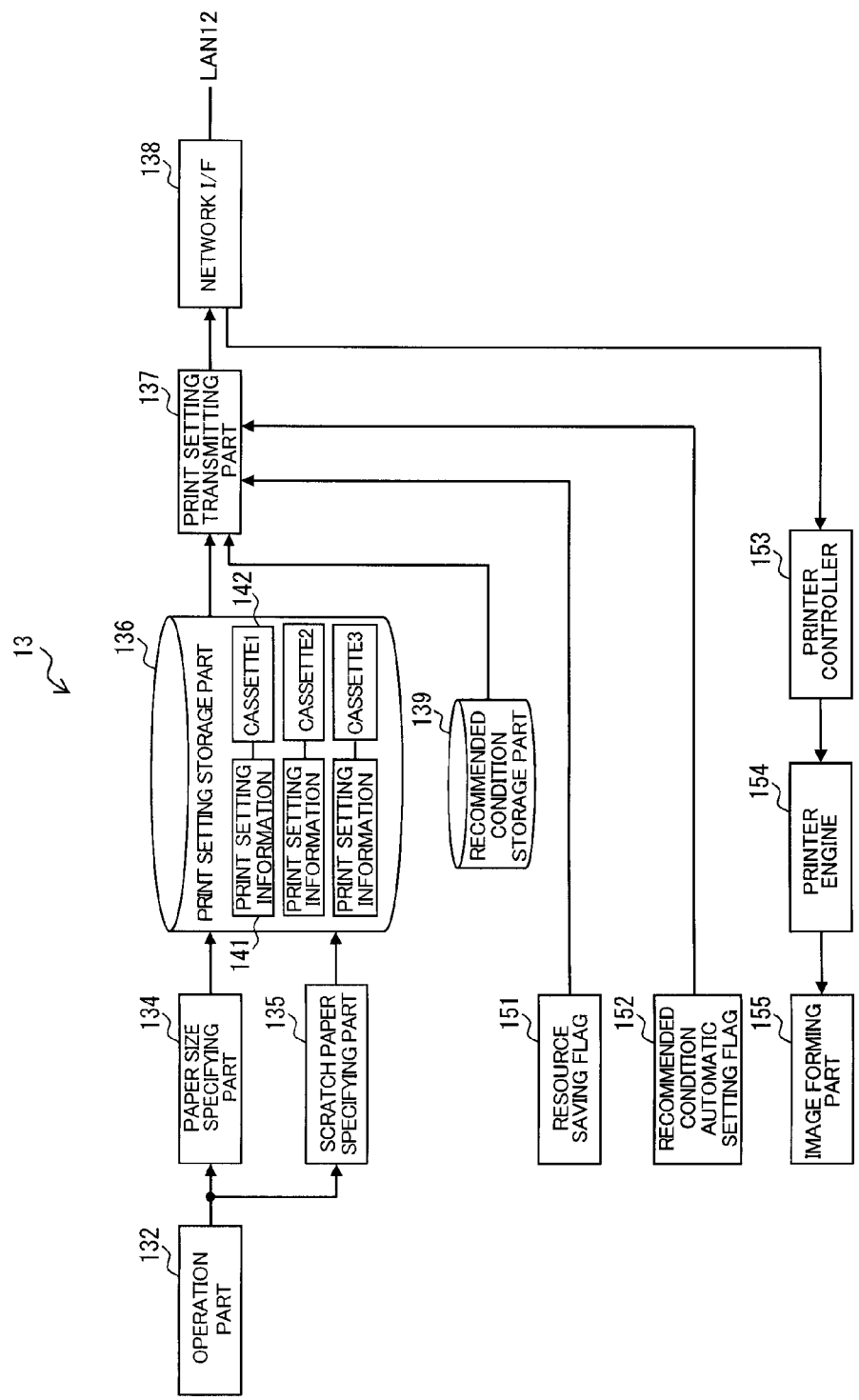
FIG. 2 is a block diagram illustrating a configuration example of the MFP 13 in FIG. 1.

FIG. 2 is a block diagram illustrating a configuration example of the MFP 13 in FIG. 1. The MFP 13 is configured to include the operation part 132, a paper size specifying part 134, scratch paper specifying part 135, print setting storage part 136, print setting transmitting part 137, network I/F (interface) 138, recommended condition storage part 139, resource saving setting flag 151, recommended condition automatic setting flag 152, printer controller 153, printer engine 154, and image forming part 155.

The paper size specifying part 134 specifies a size of sheets of recording paper. Specifically, the paper sizes of the sheets of recording paper contained in the paper feeding cassettes 133 are specified for each of the paper feeding cassettes 133. The scratch paper specifying part 135 specifies, on the basis of a user operation, whether or not the sheets of recording paper in the paper feeding cassettes 133 are sheets of scratch paper. Whether or not the sheets of recording paper are sheets of scratch paper is specified for each of the paper feeding cassettes 133.

In the print setting storage part 136, a plurality of pieces of print setting information 141 is retained which is related to pieces of identification information 142 on the paper feeding cassettes 133, respectively. Each of the pieces of print setting information 141 includes: a size of sheets of recording paper contained in a corresponding one of the paper feeding cassettes 133; and availability of double-sided printing. Information indicating the availability of double-sided printing includes: information on whether or not the sheets of recording paper in the paper feeding cassette 133 are sheets of scratch paper; and an attachment state of a double-sided printing unit. As the paper size, for example, any of A3 to A5 (A sizes), and B4 and B5 (B sizes) in standards for print sheets having an aspect ratio of 1 to 1.4 can be specified. Also, settable print conditions include the availability of double-sided printing, and a range of an aggregate number N in aggregate printing (Nin1). "Nin1" in the aggregate printing refers to printing N pages of document data on one side of a sheet of recording paper with reducing an image to be printed.

The recommended condition storage part 139 retains sets of recommended print conditions generated by an operator of the MFP 13. The sets of recommended print conditions are sets of print conditions for eco-printing or scratch paper printing corresponding to the sizes of the sheets of recording paper, and arbitrary specified from among sets of print conditions that can be combined with the paper sizes, respectively.

The resource saving setting flag 151 is a flag for switching between the normal print mode and the resource saving print mode. The recommended condition automatic setting flag 152 is a flag for specifying whether or not to automatically generate sets of recommended print conditions in each of the print data transmitting devices 11. Each of the resource saving setting flag 151 and the recommended condition automatic setting flag 152 can be switched between being enabled (on) and disabled (off) by a predetermined switching operation. By enabling the resource saving setting flag 151, modes of all of the print data transmitting devices 11 on the LAN 12 can be switched to the resource saving print mode at once.

The network I/F 138 is a network communication part that communicates with the print data transmitting devices 11 through the LAN 12. The print setting transmitting part 137 reads the pieces of print setting information 141 from the print setting storage part 136 or reads the sets of recommended print conditions from the recommended condition storage part 139 to transmit the pieces of print setting information 141 or the sets of recommended print conditions to each of the print data transmitting devices 11 through the network I/F 138.

The pieces of print setting information 141 are, at the time of turning on power, sensing a change in paper size or scratch paper information, or sensing a change in the resource saving setting flag 151, transferred to the print data transmitting device 11 together with states of the resource saving setting flag 151 and automatic setting flag 152. The sets of recommended print conditions in the recommended condition storage part 139 are, in the case where the automatic setting flag 152 is in an off state, transferred to the print data transmitting device 11 together with the pieces of print setting information 141.

The printer controller 153 receives print data through the network I/F 138, and converts the print data to image data for printing to output the image data to the printer engine 154.

The printer engine 154 is a control part that, on the basis of the print data (image data), controls the image forming part 155. The image forming part 155 is a printing part that prints the print data on a sheet of predetermined recording paper.

The pieces of print setting information 141 and the print data are packeted on the basis of a predetermined communication protocol, e.g., TCP/IP (Transmission Control Protocol/Internet Protocol), and transceived as packet data.

Figure 3:
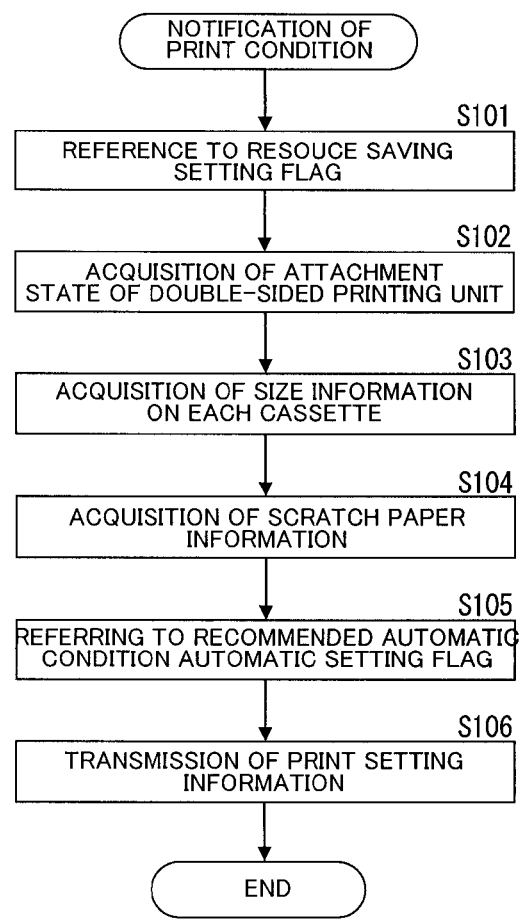
FIG. 3 is a flowchart illustrating an example of operation of the MFP 13 in FIG. 2 at the time of notification of print conditions.

Steps S101 to S106 in FIG. 3 represent a flowchart illustrating an example of operation of the MFP 13 in FIG. 2 at the time of notification of print conditions. First, when main power is turned on, or a paper size is changed, the print setting transmitting part 137 refers to a state of the resource saving setting flag 151 to detect whether or not the resource saving print mode is selected (Step S101). Then, an attachment state of the double-sided printing unit, size information on each of the paper feeding cassettes 133, and scratch paper information are sequentially acquired (Steps S102 to S104).

Subsequently, the print setting transmitting part 137 refers to a state of the recommended condition automatic setting flag 152 to detect whether or not automatic recommended print condition generation is selected (Step S105). After that, the pieces of print setting information 141 each including the pieces of information acquired in Steps S102 to S104 are transmitted to a print data transmitting device 11 together with a result of the detection of the resource saving print mode and a result of the detection of the automatic recommended condition generation (Step S106).

Figure 4:
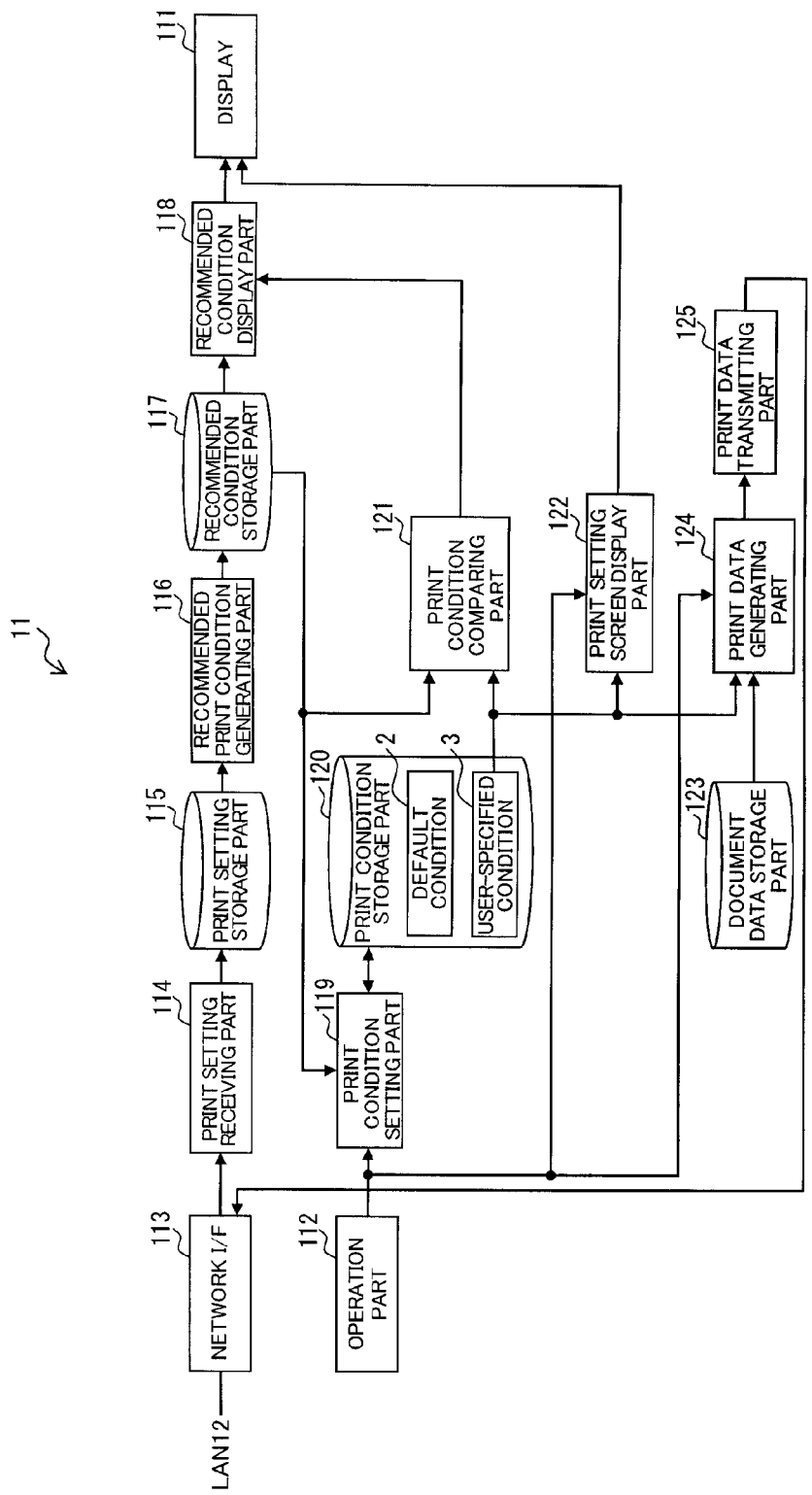
FIG. 4 is a block diagram illustrating a configuration example of a print data transmitting device 11 in FIG. 1.

FIG. 4 is a block diagram illustrating a configuration example of each of the print data transmitting devices 11 in FIG. 1. The print data transmitting device 11 is configured to include the display 111, the operation part 112, a network I/F 113, print setting receiving part 114, print setting storage part 115, recommended print condition generating part 116, recommended condition storage part 117, changing screen display part 118, print condition setting part 119, print condition storage part 120, print condition comparing part 121, print setting screen display part 122, document data storage part 123, print data generating part 124, and print data transmitting part 125.

The operation part 112 detects a user operation to generate a predetermined input signal, and outputs the input signal to the print condition setting part 119, print setting screen display part 122, and print data generating part 124. The network I/F 113 is a network communication part that communicates with the MFP 13 through the LAN 12.

The print setting receiving part 114 receives the pieces of print setting information 141 through the network I/F 113. In the print setting storage part 115, the pieces of print setting information 141 received from the MFP 13 are retained which are related to the pieces of identification information in the MFP 13, respectively. The recommended print condition generating part 116 obtains sets of recommended print conditions corresponding to the sizes of the sheets of recording paper on the basis of the pieces of print setting information 141 in the print setting storage part 115, respectively. The sets of recommended print conditions are sets of print conditions for eco-printing or scratch paper printing corresponding to the sizes of the sheets of recording paper, respectively, and one or more sets of print conditions that can be combined with each of the paper sizes are obtained. In the recommended condition storage part 117, the sets of recommended print conditions determined from the pieces of print setting information 141 are retained which are related to the paper feeding cassettes 133, respectively.

The print condition setting part 119 sets a set of print conditions on the basis of a user operation. Specifically, a set of print conditions common to a plurality of print jobs is registered as a set of default print conditions 2. Also, a set of print conditions specified by a user is set as a set of user-specified print conditions 3. In the print condition storage part 120, the set of default print conditions 2 set by the print condition setting part 119 and the set of user-specified print conditions 3 are retained.

The print condition comparing part 121 compares the sets of recommended print conditions in the recommended condition storage part 117 and the set of user-specified print conditions 3 in the print condition storage part 120 with each other, and outputs a result of the comparison to the changing screen display part 118.

The changing screen display part 118 displays the sets of recommended print conditions in the recommended condition storage part 117 on the display 111 on the basis of the comparison result by the print condition comparing part 121. Specifically, if the set of user-specified print conditions 3 does not coincide with any of the sets of recommended print conditions, a predetermined print condition changing screen that includes the sets of recommended print conditions and is arranged with recommended condition selecting buttons for selecting any of the sets of recommended print conditions as a set of print conditions is displayed. On the other hand, if the set of user-specified print conditions 3 coincides with any of the sets of recommended print conditions, the sets of recommended print conditions are not displayed. In the print condition setting part 119, on the basis of an operation of any of the recommended condition selecting buttons, an operation for changing the set of user-specified print conditions 3 to a corresponding one of the sets of recommended print conditions is performed.

In the document data storage part 123, a plurality of pieces of prepared document data are retained. The pieces of document data include pieces of document data in various format, such as in addition to document data including code information indicating characters, symbols, and the like, document data including image data on a photograph or the like.

The print setting screen display part 122 displays a print setting screen on the display 111 on the basis of a predetermined print instruction that specifies document data as a print target. On the print setting screen, display columns respectively for the user-specified print conditions, an enter button, a cancel button, and the like are arranged. The enter button is an operation icon for determining print conditions for the document data.

On the basis of the print instruction that specifies the document data as a print target, the print data generating part 124 generates print data including the set of user-specified print conditions 3 in the print condition storage part 120 as the set of print conditions for the document data, and outputs the print data to the print data transmitting part 125. The print data is generated by, on the basis of the print instruction, reading the document data from the document data storage part 123, and with use of a printer driver that is preliminarily registered as an active driver, converting the document data to the data in a predetermined format such as PDL (Page Description Language).

The print data transmitting part 125 transmits the print data generated by the print data generating part 124 to the MFP 13 through the network I/F 113. In the case where the set of user-specified print conditions 3 coincides with any of the sets of recommended print conditions, the print data generating part 124 generates the print data on the basis of an operation of the enter button, and the print data is immediately transferred to the MFP 13.

When the print instruction is given, the print condition setting part 119 stores, as the set of user-specified print conditions 3, the set of print conditions registered in the print condition storage part 120 as the set of default print conditions 2. Also, during a period of time from the display of the print setting screen to the operation of the enter button, the set of user-specified print conditions 3 can be changed by predetermined operations.

In this embodiment, if, when the enter button on the print setting screen is operated after the display of the print setting screen, the set of user-specified print conditions 3 coincides with any of the sets of recommended print conditions, the print data generating part 124 generates the print data. On the other hand, if when the enter button is operated, the set of user-specified print conditions 3 does not coincide with any of the sets of recommended print conditions, the changing screen display part 118 displays the print condition changing screen in order to prompt an operator to change the set of print conditions.

In the case where the set of user-specified print conditions 3 is changed by an operation of any of the recommended condition selecting buttons on the print condition changing screen, the print setting screen display part 122 displays, on the print setting screen, a registration button for registering a set of user-specified print conditions 3 after the change as a set of default print conditions. In the print condition setting part 119, on the basis of an operation of the registration button on the print setting screen, an operation for registering the set of user-specified print conditions 3 as the set of default print conditions is performed.

Figure 5:
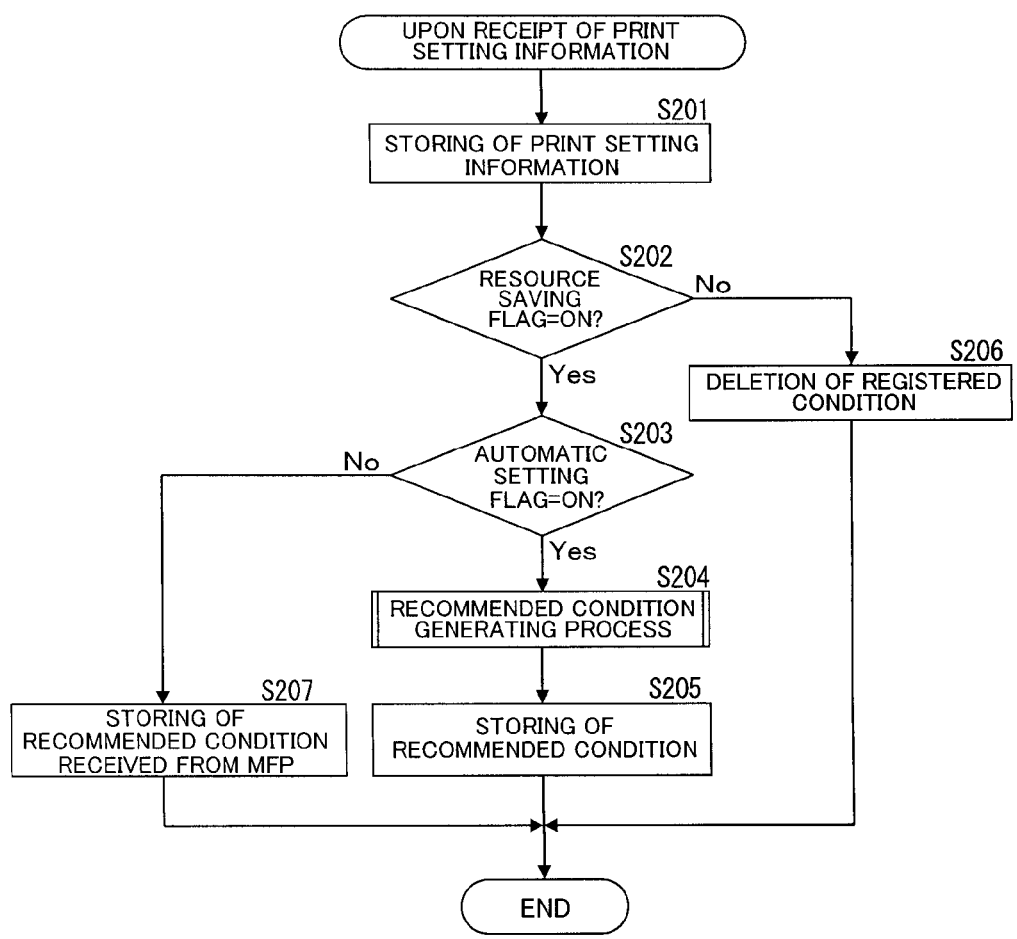
FIG. 5 is a flowchart illustrating an example of operation of the print data transmitting device 11 in FIG. 4 at the time of receiving print setting information.

Steps S201 to S207 in FIG. 5 represent a flowchart illustrating an example of operation of the print data transmitting device 11 in FIG. 4 at the time of receiving the pieces of print setting information. First, upon receipt of the pieces of print setting information 141 through the network I/F 113, the print setting receiving part 114 stores the pieces of print setting information 141 in the print setting storage part 115 (Step S201).

Then, the recommended print condition generating part 116 refers to a state of the resource saving setting flag 151, and if the normal print mode is selected, deletes sets of print conditions registered as sets of recommended print conditions from the recommended condition storage part 117 to terminate this processing flow (Steps S202 and S206).

On the other hand, if the resource saving print mode is selected, the recommended print condition generating part 116 refers to a state of the recommended condition automatic setting flag 152 (Steps S202 and S203). At this time, if the automatic recommended print condition generation is selected, the recommended print condition generating part 116 generates sets of recommended print conditions on the basis of the pieces of print setting information 141 in the print setting storage part 115, respectively, and stores the sets of recommended print conditions in the recommended condition storage part 117 (Steps S204 and S205).

On the other hand, if the automatic recommended print condition generation is not selected, the recommended print condition generating part 116 stores, without performing a recommended print condition generating process based on the pieces of print setting information 141, the sets of recommended print conditions, which are received together with the pieces of print setting information 142 from the MFP 13, in the recommended condition storage part 117 (Step S207)

Figure 6:
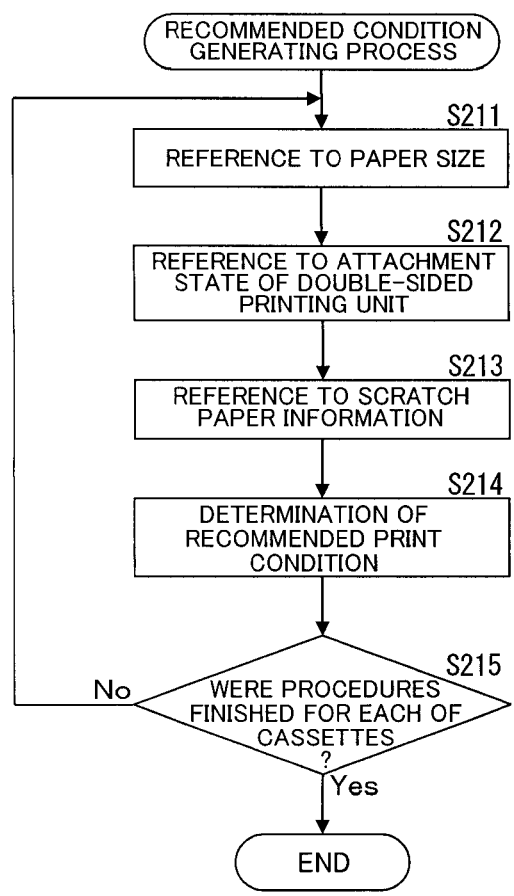
FIG. 6 is a flowchart illustrating an example of a recommended print condition generating process in the print data transmitting device 11 in FIG. 4.

Steps S211 to S215 in FIG. 6 represent a flowchart illustrating an example of the recommended print condition generating process in the print data transmitting device 11 in FIG. 4. First, the recommended print condition generating part 116 sequentially refers to a paper size, an attachment state of the double-sided printing unit, and scratch paper information (Steps S211 to S213), and determines a set of print conditions for eco-printing corresponding to the paper size and availability of double-sided printing (Step S214).

This causes recommended condition sets including one or more sets of recommended print conditions to be generated. The processing procedure from Step S211 to Step S214 is repeatedly performed for each of the paper feeding cassettes 113 of the MFP 13, and when the recommended condition sets are generated for all of the paper feeding cassettes 133, this processing flow ends (Step S215).

FIG. 7 is a diagram illustrating an example of operation of the print data transmitting device 11 in FIG. 4 at the time of recommended condition generation, in which the recommended condition sets including a plurality of sets of recommended print conditions are illustrated. The recommended condition sets are generated on the basis of each of the pieces of print setting information 141 in the print setting storage part 115, and retained related to each of the paper sizes.

Specifically, in the case where the double-sided printing unit is attached, and new sheets are used, as a set of print conditions for eco-printing, which can be combined with a paper size of A3, there are five setting patterns of aggregate printing "2in1" (reduced to A4), aggregate printing "4in1" (reduced to A5), aggregate printing "2in1" and double-sided printing, aggregate printing "4in1" and double-sided printing, and double-sided printing.

Also, as a set of print conditions for eco-printing, which can be combined with a paper size of B4, there are three setting patterns of aggregate printing "2in1" (reduced to B5), aggregate printing "2in1" and double-sided printing, and double-sided printing. Further, as a set of print conditions for eco-printing, which can be combined with a paper size of A4, there are three setting patterns of aggregate printing "2in1" (reduced to A5), aggregate printing "2in1" and double-sided printing, and double-sided printing. Still further, as a set of print conditions for eco-printing, which can be combined with a paper size of B5 or A5, there is one setting pattern of double-sided printing in either case.

On the other hand, in the case where the double-sided printing unit is not attached, or scratch paper is used, as a set of print conditions for eco-printing, which can be combined with a paper size of A3, there are two setting patterns of aggregate printing "2in1" (reduced to A4), and aggregate printing "4in1" (reduced to A5).

Also, as a set of print conditions for eco-printing, which can be combined with a paper size of B4, there is one setting pattern of aggregate printing "2in1" (reduced to B5). Further, as a set of print conditions for eco-printing, which can be combined with a paper size of A4, there is one setting pattern of aggregate printing "2in1" (reduced to A5). Still further, a set of print conditions for eco-printing, which can be combined with a paper size of B5 or A5, is not present.

Figure 8:
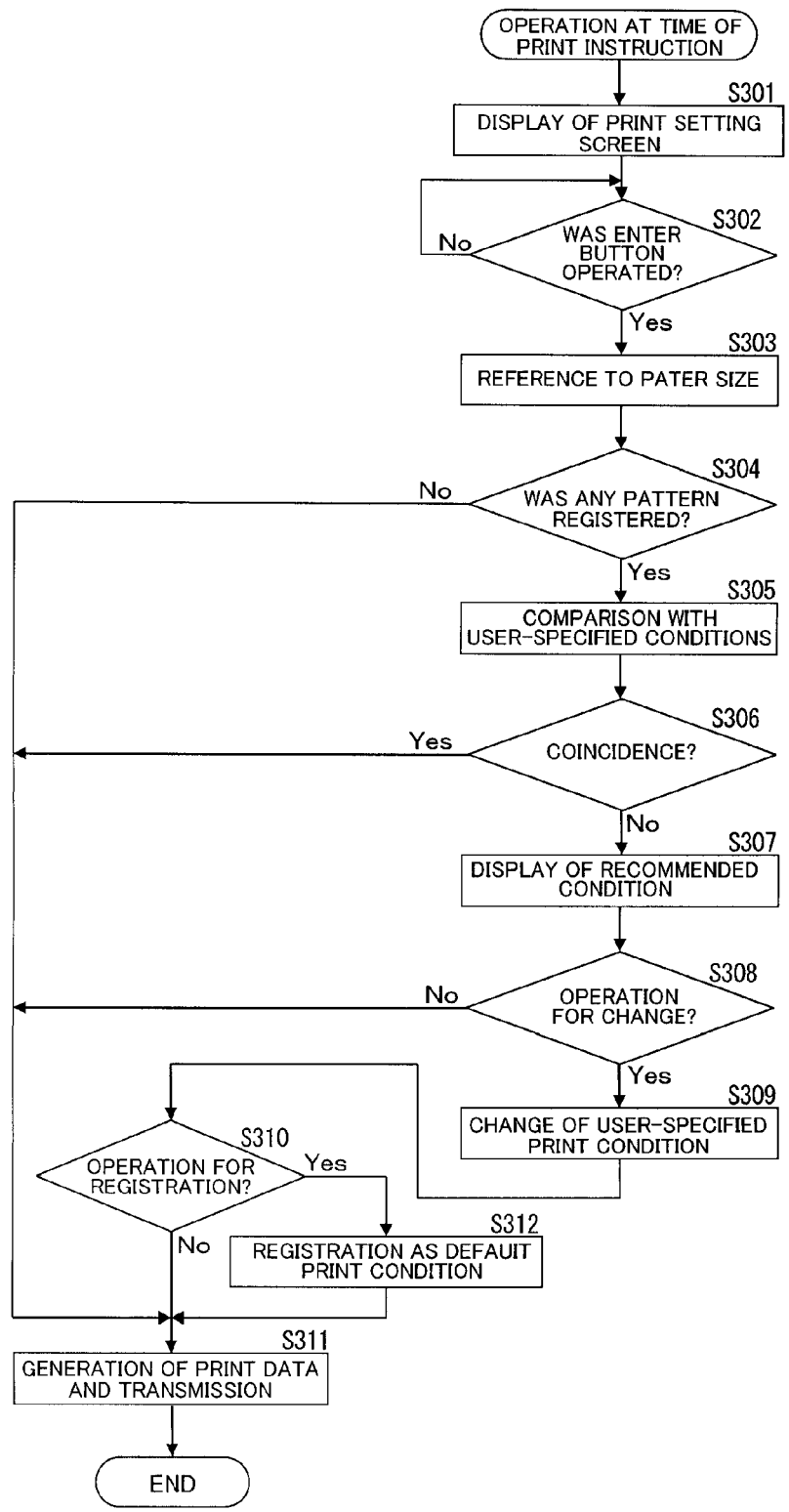
FIG. 8 is a flowchart illustrating an example of operation of the print data transmitting device 11 in FIG. 4 at the time of a print instruction.

Steps S301 to S312 in FIG. 8 represent a flowchart illustrating the example of the operation of the print data transmitting device 11 in FIG. 4 at the time of the print instruction.

First, when the predetermined print instruction is given, the print setting screen display part 122 displays the print setting screen on the display 111 (Step S301).

Then, if the enter button on the print setting screen is operated, the print condition comparing part 121 refers to a document size specified as one of the user-specified print conditions 3, and determines whether or not any set of recommended print conditions corresponding to the document size is registered (Step S302 to S304). At this time, if any set of recommended print conditions corresponding to the document size is not registered, the print data is generated according to the set of user-specified print conditions 3, and transmitted to the MFP 13 (Step S311).

On the other hand, if any set of recommended print conditions corresponding to the document size is registered, the print condition comparing part 121 compares the set of user-specified print conditions 3 and the sets of recommended print conditions with each other (Steps S305 and S306). At this time, if the set of user specified print conditions 3 coincides with any of the sets of recommended print conditions, the print data is generated according to the set of user-specified print conditions 3, and transmitted to the MFP 13 (Step S311).

On the other hand, if the set of user-specified print conditions 3 does not coincide with any of the sets of recommended print conditions, the changing screen display part 118 displays the print condition changing screen on the print setting screen (Step S307). Then, in the case of sensing an operation of any of selection buttons on the print condition changing screen, the print condition setting part 119 changes the set of user-specified print conditions 3 to a corresponding one of the sets of recommended print conditions on the basis of the button operation (Steps S308 and S309). In the case of not changing the set of user-specified print conditions 3, the print data is generated according to the set of user-specified print conditions 3, and transmitted to the MFP 13 (Step S311)

Also, in the case of sensing an operation of the registration button on the print setting screen after the change of the set of user-specified print conditions 3, the print condition setting part 119 registers a set of user-specified print conditions 3 after the change as a set of default print conditions (Steps S310 and S312). Subsequently, print data is generated according to the set of user-specified print conditions 3 after the change, and transmitted to the MFP 13 (Step S311).

Figure 9:
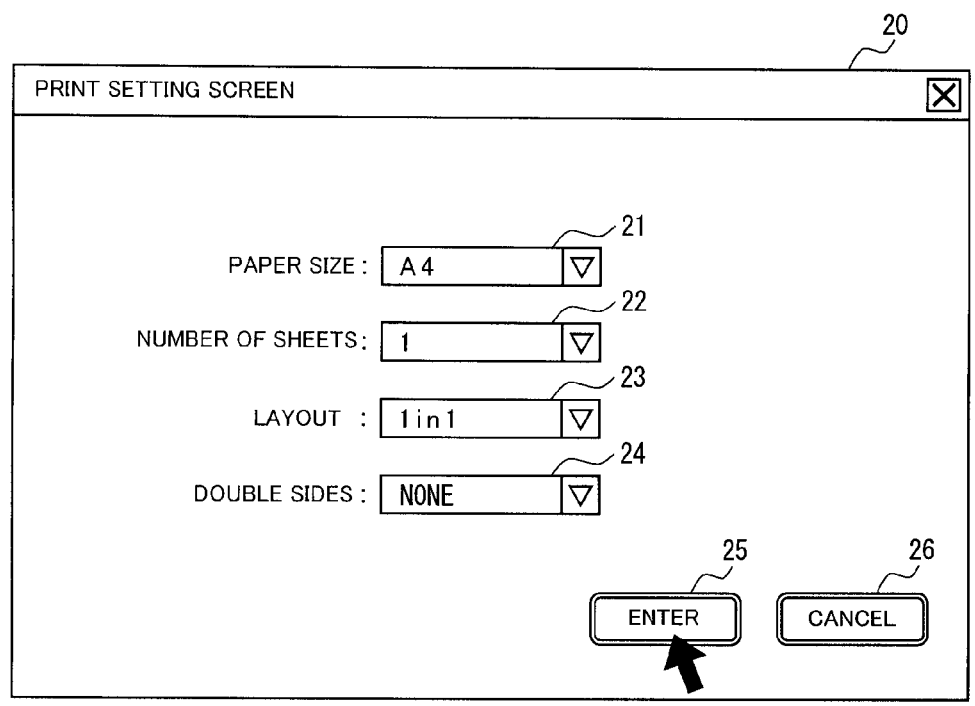
FIG. 9 is a diagram illustrating the example of the operation of the print data transmitting device 11 in FIG. 4 at the time of the print instruction, in which a print setting screen 20 is illustrated.

FIG. 9 is a diagram illustrating the example of the operation of the print data transmitting device 11 in FIG. 4 at the time of the print instruction, in which the print setting screen 20 is illustrated. The print setting screen 20 is an editing screen that is displayed on the display 111 on the basis of the print instruction specifying the document data as a print target, on which the display columns 21 to 24 respectively for the user-specified print conditions 3, the enter button 25, and the cancel button 26 are arranged.

In the display column 21, a paper size is displayed; in the display column 22, the number of sheets to be printed is displayed; in the display column 23, layout information is displayed; and in the display column 24, yes/no of the double-sided printing is displayed. In this example, the paper size "A4", the number of sheets "1", the normal printing "1in1", and the double-sided printing "no" are specified.

When the enter button 25 is operated, a set of print conditions for the document data can be fixed to transmit print data to the MFP 13. When the cancel button 26 is operated, the print setting screen is restored to the screen before the print instruction. A set of currently displayed print conditions can be changed by predetermined changing operations.

Figure 10:
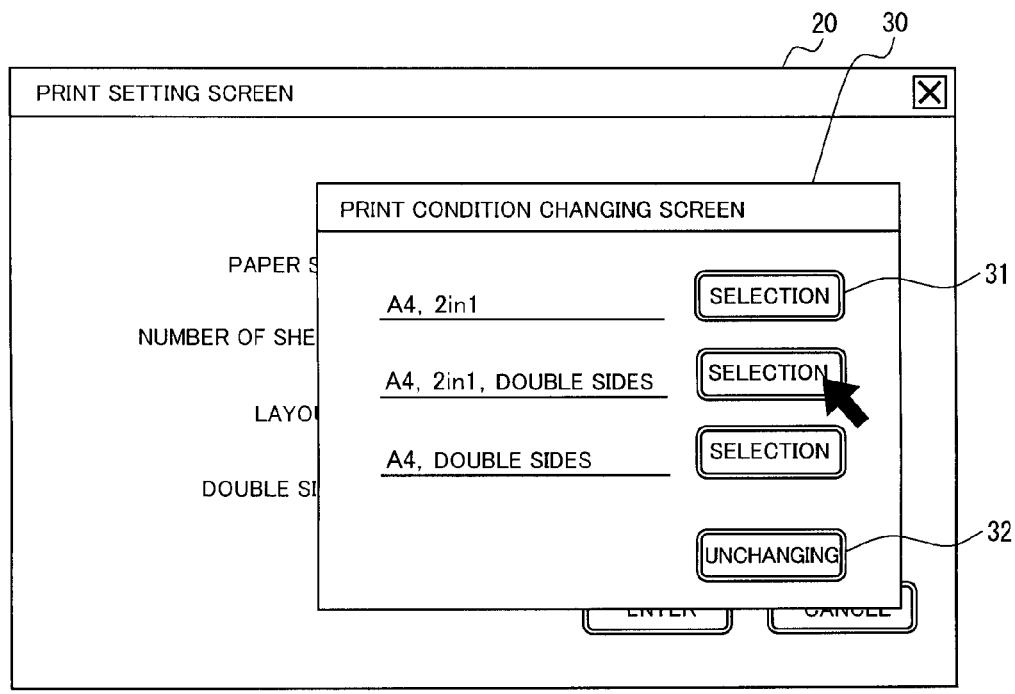
FIG. 10 is a diagram illustrating the example of the operation of the print data transmitting device 11 in FIG. 4 at the time of the print instruction, in which a print condition changing screen 30 arranged with the recommended condition sets is illustrated.

FIG. 10 is a diagram illustrating the example of the operation of the print data transmitting device 11 in FIG. 4 at the time of the print instruction, in which the print condition changing screen 30 arranged with recommended condition sets is illustrated. The print condition changing screen 30 is an editing screen that includes the recommended condition sets consisting of a plurality of sets of recommended print conditions, and is arranged with the plurality of selection buttons 31 and an unchanging button 32. Each of the sets of recommended print conditions is a set of print conditions for eco-printing or scratch paper printing corresponding to the paper feeding cassette that is preliminarily specified in the set of user-specified print conditions 3. Each of the selection buttons 31 is a recommended print condition selecting operation icon for changing the set of user-specified print conditions 3 to a corresponding one of the sets of recommended print conditions, and arranged with being related to the set of recommended print conditions.

In the case where the set of user-specified print conditions 3 does not coincide with any of the sets of recommended print conditions, the print condition changing screen 30 is displayed by operating the enter button 25 on the print setting screen 20. On the print condition changing screen 30, the selectable sets of recommended print conditions are displayed, and by operating any of the selection buttons 31, a corresponding one of the sets of recommended print conditions can be specified as the set of user-specified print conditions 3. On the other hand, in the case of operating the unchanging button 32, print data is generated according to the set of user-specified print conditions 3, and transmitted to the MFP 13.

Figure 11:
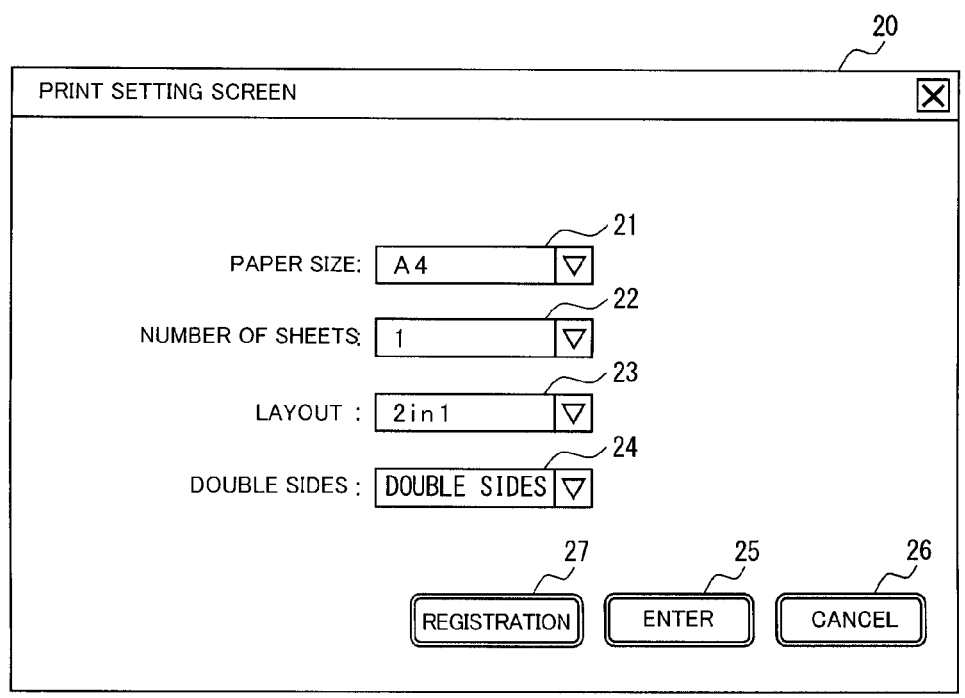
FIG. 11 is a diagram illustrating the example of the operation of the print data transmitting device 11 in FIG. 4 at the time of the print instruction, in which the print setting screen 20 after an operation of one of the selection buttons 31 is illustrated.

FIG. 11 is a diagram illustrating the example of the operation of the print data transmitting device 11 in FIG. 4 at the time of the print instruction, in which the print setting screen 20 after an operation of one of the selection buttons 31 is illustrated. On the print setting screen 20, the set of user-specified print conditions 3 is displayed which is changed to a set of recommended print conditions selected on the print condition changing screen 30.

By operating the registration button 27 on the print setting screen 20, the set of user-specified print conditions 3 after the change is registered as the set of default print conditions 2. On the other hand, in the case of operating the enter button 25 without operating the registration button 27, the set of default print conditions 2 is not updated, and print data is generated according to the set of user-specified print conditions 3 after the change, and transmitted to the MFP 13.

According to the present invention, an operator of a print data transmitting device 11 can be taught the sets of print conditions for eco-printing or scratch paper printing corresponding to the sizes of the sheets of recording paper contained in the MFP 13 as the sets of recommended print conditions, respectively, and change a set of print conditions for document data to be printed to any of the sets of recommended print conditions as needed. In particular, the user can recognize on the print condition changing screen 30 that there are the plurality of sets of recommended print conditions corresponding to the sizes of the sheets of recording paper, as well as being able to select a'desired one of the sets of recommended print conditions as the set of print conditions for the document data.

Also, in the case of operating any of the selection buttons 31 to change the set of user-specified print conditions 3, by operating the registration button 27 displayed on the print setting screen 20, a set of recommended print conditions can be registered in a print data transmitting device 11 as a new set of default print conditions 2.

In the first embodiment, described is an example of the case of, on the basis of a print condition comparison result, displaying the print condition changing screen 30. On the other hand, in the present embodiment, described is the case of, on the basis of a change history of a set of user-specified print conditions 3, determining whether or not to display a print condition changing screen 30.

Figure 12:
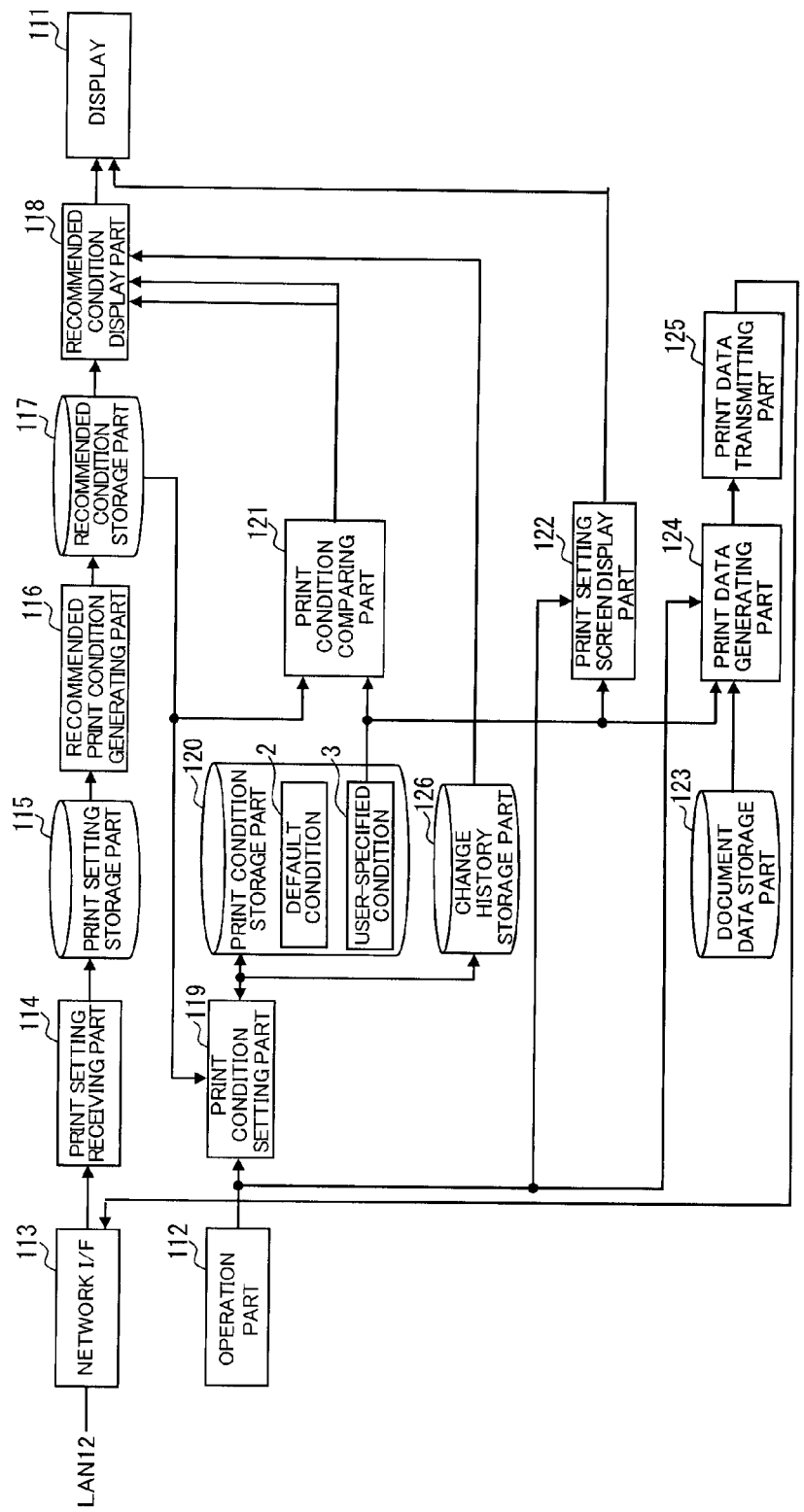
FIG. 12 is a block diagram illustrating a configuration example of a print data transmitting device 11 according to a second embodiment of the present invention.

FIG. 12 is a block diagram illustrating a configuration example of a print data transmitting device 11 according to the second embodiment of the present invention. The print data transmitting device 11 is, as compared with the print data transmitting device 11 in FIG. 4, different in being provided with a change history storage part 126. In the change history storage part 126, the change history of the set of user-specified print conditions 3 during a period of time from display of a print setting screen 20 to an operation of an enter button 25 is retained.

On the basis of the change history in the change history storage part 126, a changing screen display part 118 determines whether or not to display the print condition changing screen 30. Specifically, in the case where the set of user-specified print conditions 3 for eco-printing has been changed, even if a set of user-specified print conditions 3 after the change does not coincide with any of sets of recommended print conditions, the print condition changing screen 30 is not displayed. That is, the print condition changing screen 30 is displayed only in the case where the set of user-specified print conditions 3 for eco-printing is not changed, and does not coincide with any of the sets of recommended print conditions.

According to the present embodiment, depending on the change history of the set of user-specified print conditions 3 during the period of time from the display of the print setting screen 20 to the operation of the enter button 25, the print condition changing screen 30 can be displayed. For example, even in the case where the set of user-specified print conditions 3 does not coincide with any of the sets of recommended print conditions, if the set of user-specified print conditions 3 for eco-printing or scratch paper printing has been changed, print data can be immediately transmitted to an MFP 13 without displaying the print condition changing screen 30.

In the first embodiment, described is an example of the case where the print data transmitting device 11 generates the sets of recommended print conditions on the basis of the pieces of print setting information 141 transferred from the MFP 13. On the other hand, in the present embodiment, described is the case where an MFP 13 generates sets of recommended print conditions on the basis of pieces of print setting information 141.

Figure 13:
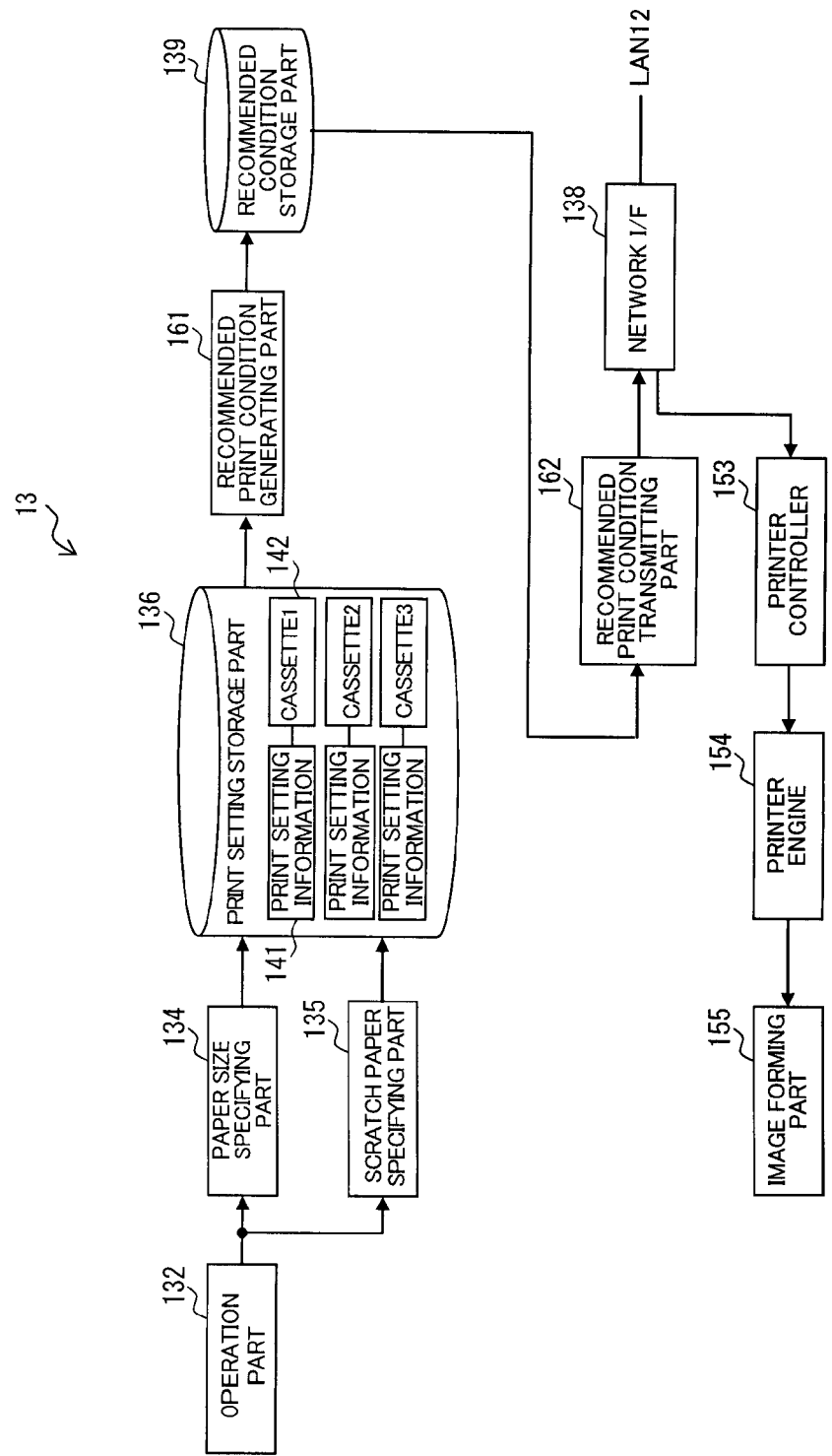
FIG. 13 is a block diagram illustrating a configuration example of an MFP 13 in a network printing system 1 according to a third embodiment of the present invention.

FIG. 13 is a block diagram illustrating a configuration example of the MFP 13 in a network printing system 1 according to the third embodiment of the present invention. The MFP 13 is configured to include an operation part 132, paper size specifying part 134, scratch paper specifying part 135, print setting storage part 136, network I/F 138, recommended condition storage part 139, printer controller 153, printer engine 154, image forming part 155, recommended print condition generating part 161, and recommended print condition transmitting part 162.

Configurations of the operation part 132, paper size specifying part 134, scratch paper specifying part 135, print setting storage part 136, network I/F 138, printer controller 153, printer engine 154, and image forming part 155 are the same as those of the MFP 13 in FIG. 2.

The recommended print condition generating part 161 obtains the sets of recommended print conditions corresponding to sizes of sheets of recording paper on the basis of the pieces of print setting information 141 in the print setting storage part 136. The sets of recommended print conditions are sets of print conditions for eco-printing or scratch paper printing corresponding to the sizes of the sheets of recording paper, respectively, and one or more sets of print conditions that can be combined with each of the paper sizes are obtained.

In the recommended condition storage part 139, the sets of recommended print conditions determined from the pieces of print setting information 141 are retained which are related to paper feeding cassettes 133, respectively. The recommended print condition transmitting part 162 reads the sets of recommended print conditions from the recommended condition storage part 139, and transmits them to a print data transmitting device 11 through the network I/F 138.

Figure 14:
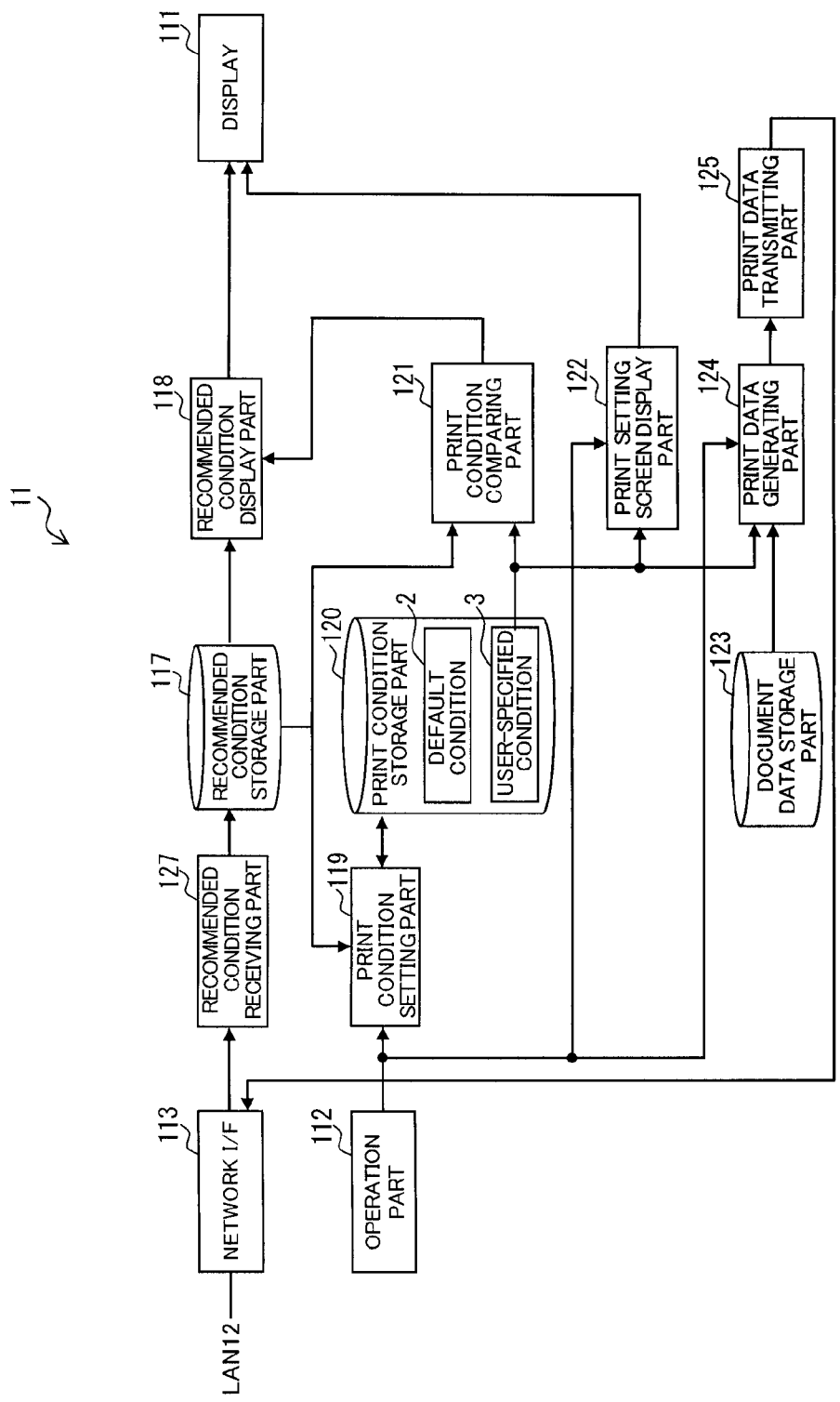
FIG. 14 is a block diagram illustrating a configuration example of a print data transmitting device 11 in the network printing system 1 in FIG. 13.

FIG. 14 is a block diagram illustrating a configuration example of a print data transmitting device 11 in the network printing system 1 in FIG. 13. The print data transmitting device 11 is configured to include a display 111, operation part 112, network I/F 113, recommended condition storage part 117, changing screen display part 118, print condition setting part 119, print condition storage part 120, print condition comparing part 121, print setting screen display part 122, document data storage part 123, print data generating part 124, print data transmitting part 125, and recommended print condition receiving part 127.

Configurations of the display 111, operation part 112, network I/F 113, changing screen display part 118, print condition setting part 119, print condition storage part 120, print condition comparing part 121, print setting screen display part 122, document data storage part 123, print data generating part 124, and print data transmitting part 125 are the same as those of the print data transmitting device 11 in FIG. 4.

The recommended print condition receiving part 127 receives the set of recommended print conditions through the network I/F 113. In the recommended condition storage part 117, the sets of recommended print conditions received from the MFP 13 are retained which are related to pieces of identification information in the MFP 13. The print condition comparing part 121 compares the sets of recommended print conditions and a set of user-specified print conditions 3 with each other, and outputs a result of the comparison to the changing screen display part 118.

According to the present embodiment, the sets of print conditions for eco-printing or scratch paper printing corresponding to the sizes of the sheets of recording paper in the paper feeding cassettes 133 can be notified to a print data generating device 11 as the sets of recommended print conditions, and therefore an operator of the print data transmitting device 11 can be taught the sets of appropriate print conditions corresponding to the sizes of the sheets of recording paper as needed.

DESCRIPTION OF REFERENCE SYMBOLS

1 Network printing system
11 Print data transmitting device
111 Display
112 Operation part
113 Network I/F
114 Print setting receiving part
115 Print setting storage part
116 Recommended print condition generating part
117 Recommended condition storage part
118 Changing screen display part
119 Print condition setting part
120 Print condition storage part 121 Print condition comparing part
122 Print setting screen display part
123 Document data storage part
124 Print data generating part
125 Print data transmitting part
126 Change history storage part
127 Recommended print condition receiving part
12 LAN
13 MFP
131 Display part
132 Operation part
133 Paper feeding cassette
134 Paper size specifying part
135 Scratch paper specifying part
136 Print setting storage part
137 Print setting transmitting part
138 Network I/F
139 Recommended condition storage part
141 Print setting information
151 Resource saving setting flag
152 Recommended condition automatic setting flag
153 Printer controller
154 Printer engine
155 Image forming part
161 Recommended print condition generating part
162 Recommended print condition transmitting part
20 Print setting screen
25 Enter button
30 Print condition changing screen
31 Selection button

The invention claimed is:

1. A network printing system including a printing apparatus and a print data transmitting device that transmits print data including document data as a print target and a print condition for the document data to said printing apparatus through a communication network, wherein said printing apparatus receives said print data to print said print data on recording paper, wherein said printing apparatus comprises:
a recording paper containing part that contains said recording paper; and
a print setting storage part that retains print setting information including a size of the recording paper in said recording paper containing part and availability of double-sided printing, and
said print data transmitting device comprises:
a user-specified print condition storage part that retains a print condition specified by a user as a user-specified print condition;
a print condition comparing part that compares a recommended print condition corresponding to the size of said recording paper and said user-specified print condition with each other, the recommended print condition being obtained from said print setting information;
a changing screen display part that, in a case where said user-specified print condition does not coincide with said recommended print condition, displays a print condition changing screen that includes said recommended print condition and is arranged with a recommended condition selecting button for selecting said recommended print condition as the print condition;
a print condition changing part that, on a basis of an operation of said recommended condition selecting button, changes said user-specified print condition;
a print data generating part that, on a basis of a print instruction that specifies the document data as the print target, generates said print data including the user-specified print condition in said user-specified print condition storage part as the print condition for the document data;
a print data transmitting part that transmits said print data to said printing apparatus; and
a print setting screen display part that, on the basis of said print instruction, displays a print setting screen that includes said user-specified print condition and is arranged with an enter button for the print condition, wherein on said print condition changing screen, two or more recommended print conditions are arranged for the one size of said recording paper, and by operating said recommended condition selecting button, said user-specified print condition can be changed to any of said recommended print conditions, and in a case where said user-specified print condition coincides with any of said recommended print conditions, on a basis of an operation of said enter button, said print data generating part generates said print data, whereas in a case where said user-specified print condition does not coincide with any of said recommended print conditions, on the basis of the operation of said enter button, said changing screen display part displays said print condition changing screen.

2. The network printing system according to claim 1, wherein said print data transmitting device comprises a change history storage part that retains a change history of said user-specified print condition during a period of time from the display of said print setting screen to the operation of said enter button, and on a basis of said change history, the changing screen display part determines whether or not to display said print condition changing screen.

3. The network printing system according to claim 2, wherein said user-specified print condition storage part stores a print condition as said user-specified print condition on the basis of said print instruction, the print condition being registered as a default print condition, and in a case where said user-specified print condition is changed by the operation of said recommended condition selecting button, said print setting screen display part displays on said print setting screen a registration button for registering a user-specified print condition after the change as said default print condition.

4. The network printing system according to claim 1, wherein said user-specified print condition storage part stores a print condition as said user-specified print condition on the basis of said print instruction, the print condition being registered as a default print condition, and in a case where said user-specified print condition is changed by the operation of said recommended condition selecting button, said print setting screen display part displays on said print setting screen a registration button for registering a user-specified print condition after the change as said default print condition.

5. A print data transmitting device that, to a printing apparatus through a communication network, transmits print data including document data as a print target and a print condition for the document data, the print data transmitting device comprising:

a user-specified print condition storage part that retains a print condition specified by a user as a user-specified print condition;

a print setting acquisition part that, from said printing apparatus through said communication network, acquires print setting information including a size of recording paper and availability of double-sided printing;

a recommended print condition generating part that, on a basis of said print setting information, obtains a recommended print condition corresponding to the size of said recording paper;

a print condition comparing part that compares said user-specified print condition and said recommended print condition with each other;

a changing screen display part that, in a case where said user-specified print condition does not coincide with said recommended print condition, displays a print condition changing screen that includes said recommended print condition and is arranged with a recommended condition selecting button for selecting said recommended print condition as the print condition;

a print condition changing part that, on a basis of an operation of said recommended condition selecting button, changes said user-specified print condition;

a print data generating part that, on a basis of a print instruction that specifies the document data as the print target, generates said print data including the user-specified print condition in said user-specified print condition storage part as the print condition for the document data;

a print data transmitting part that transmits said print data to said printing apparatus; and a print setting screen display part that, on the basis of said print instruction, displays a print setting screen that includes said user-specified print condition and is arranged with an enter button for the print condition, wherein on said print condition changing screen, two or more recommended print conditions are arranged for the one size of said recording paper, and by operating said recommended condition selecting button, said user-specified print condition can be changed to any of said recommended print conditions, and in a case where said user-specified print condition coincides with any of said recommended print conditions, on a basis of an operation of said enter button, said print data generating part generates said print data, whereas in a case where said user-specified print condition does not coincide with any of said recommended print conditions, on the basis of the operation of said enter button, said changing screen display part displays said print condition changing screen.

6. A non-transitory computer-readable storage medium for storing a computer program that is executed in a print data transmitting device that, to a printing apparatus through a communication network, transmits print data including document data as a print target and a print condition for the document data, the computer program comprising:

a user-specified print condition storage step of storing a print condition specified by a user as a user-specified print condition;

a print setting acquisition step of, from said printing apparatus through said communication network, acquiring print setting information including a size of recording paper and availability of double-sided printing;

a recommended print condition generating step of, on a basis of said print setting information, obtaining a recommended print condition corresponding to the size of said recording paper;

a print condition comparing step of comparing said user-specified print condition and said recommended print condition with each other;

a changing screen display step of, in a case where said user-specified print condition does not coincide with said recommended print condition, displaying a print condition changing screen that includes said recommended print condition and is arranged with a recommended condition selecting button for selecting said recommended print condition as the print condition;

a print condition changing step of on a basis of an operation of said recommended condition selecting button, changing said user-specified print condition;

a print data generating step of, on a basis of a print instruction that specifies the document data as the print target, generating said print data including said user-specified print condition as the print condition for the document data;

a print data transmitting step of transmitting said print data to said printing apparatus; and a print setting screen display step that, on the basis of said print instruction, displays a print setting screen that includes said user-specified print condition and is arranged with an enter button for the print condition, wherein on said print condition changing screen, two or more recommended print conditions are arranged for theone size of said recording paper, and by operating said recommended condition selecting button, said user-specified print condition can be changed to any of said recommended print conditions, and in a case where said user-specified print condition coincides with any of said recommended print conditions in said print data generating step, on a basis of an operation of said enter button, said print data is generated, whereas in a case where said user-specified print condition does not coincide with any of said recommended print conditions, on the basis of the operation of said enter button, said print condition changing screen is displayed in said changing screen display step.

print setting screen a registration button for registering a user-specified print condition after the change as said default print condition.

* * * * *